United States Patent [19]

Wright

[11] 4,348,467
[45] Sep. 7, 1982

[54] ELECTROCHEMICAL CELLS CONTAINING LIQUID SODIUM AS THE ANODIC MATERIAL

[75] Inventor: Michael L. Wright, Allestree, England

[73] Assignee: Chloride Silent Power Limited, London, England

[21] Appl. No.: 280,958

[22] Filed: Jul. 7, 1981

[30] Foreign Application Priority Data

Jul. 21, 1980 [GB] United Kingdom ............... 8023740

[51] Int. Cl.³ .............................................. H01M 4/00
[52] U.S. Cl. ..................................... 429/94; 429/104; 429/191
[58] Field of Search .......................... 429/104, 191, 94

[56] References Cited

U.S. PATENT DOCUMENTS

| 4,048,391 | 9/1977 | Tilley et al. | 429/104 |
| 4,049,885 | 9/1977 | Mitoff | 429/104 |
| 4,173,686 | 11/1979 | Brennan | 429/104 |
| 4,294,897 | 10/1981 | Bindin | 429/104 |

Primary Examiner—Charles F. LeFevour
Attorney, Agent, or Firm—Beveridge, DeGrandi & Kline

[57] ABSTRACT

In a sodium sulphur cell having a solid electrolyte tube separating an annular anodic region containing liquid sodium from a cathodic reactant, this anodic region containing also metallic aluminium flakes constituting a wicking medium.

4 Claims, 2 Drawing Figures 4,348,467

ELECTROCHEMICAL CELLS CONTAINING LIQUID SODIUM AS THE ANODIC MATERIAL

BACKGROUND OF THE INVENTION

1. Field of the Invention

This invention relates to electrochemical cells containing liquid sodium as the anodic material.

2. Prior Art

In sodium sulphur cells, liquid sodium forming the anodic material is separated by a solid electrolyte, usually of beta alumina, from the cathodic reactant comprising sulphur/sodium polysulphides. The anodic and cathodic materials, if allowed to mix, as would occur if the electrolyte was breached, react exothermically and for this reason it is the practice, in such cells, to maintain only a small quantity of sodium over the anodic surface of the electrolyte element, gas pressure and/or a capillary or wicking system being used to force or draw up sodium from a reservoir into the anodic region adjacent the electrolyte. In a tubular cell, the anodic region is an annular region between one surface of the electrolyte tube and an anode current collector; the sodium may be inside or outside the electrolyte tube. Very conveniently however the anode current collector is a metal housing surrounding the electrolyte tube and the sodium is in the annular region between this housing and the electrolyte tube. To constitute a wicking medium and to reduce the quantity of sodium in this annular region, it is a common practice to fill the region with carbon powder or small glass beads or alumina, these materials being chemically and electrochemically inert with respect to the sodium and the electrolyte material. See for example U.S. Pat. No. 4,048,391.

SUMMARY OF THE INVENTION

According to the present invention, in an electrochemical cell having a solid electrolyte separating a cathodic reactant from liquid sodium in an anodic region adjacent the surface of the electrolyte, said anodic region contains aluminium particles in the form of flakes.

Such flake particles have flat surfaces and hence will tend to cling to flat surfaces and will follow the meniscus of the liquid sodium. Because the aluminium is readily wettable by liquid sodium and because the aluminium flakes provide a wick structure with a very small pore size, these flakes constitute a highly efficient filler material for filling the anodic region in an electrochemical cell containing liquid sodium as the anodic material, enabling efficient wetting of the surface of the electrolyte to be obtained with good capillary action to ensure wetting of the whole surface of the electrolyte whilst maintaining as little sodium as possible within the anodic region. The aluminium flakes give improved flow of the liquid sodium compared with granular carbon or glass balls or alumina powder such as has been used heretofore.

A further advantage of the use of metallic aluminium flakes is that the aluminium will react with any sodium oxide which might be present in the sodium as an impurity to form sodium aluminate. Aluminium oxide is chemically and electrochemically inert in the anodic region of such a cell whereas sodium oxide may modify the surface properties of the beta-alumina electrolyte in a manner tending to increase the resistance of the cell.

DESCRIPTION OF THE PREFERRED EMBODIMENT

Figure 1:
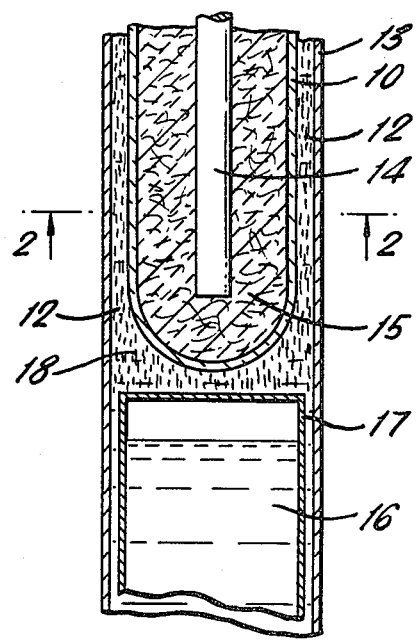
FIG. 1 is a diagrammatic part longitudinal section of a tubular sodium sulphur cell constituting one embodiment of the invention.
Figure 2:
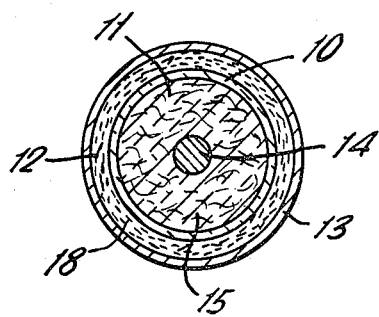
FIG. 2 is a transverse section through the cell of FIG. 1 along the line 2—2.

Referring to the drawings, there is shown diagrammatically a sodium sulphur cell in which an electrolyte tube 10 formed of beta-alumina and closed at one end separates a cathodic region 11 inside the tube from an annular anodic region 12 between the tube and an outer cylindrical steel housing 13. The cathodic region, in the known way includes an axially extending cathode current collector 14 and a matrix 15 of fibre material, typically graphite fibre felt, which matrix is impregnated with sulphur/sodium polysulphides constituting the cathodic reactant. The fibre matrix extends between the inner surface of the electrolyte tube and the cathode current collector 14.

The anodic region 12 contains liquid sodium which has to cover the outer surface of the electrolyte tube. In operation, sodium passes as sodium ions through the electrolyte and into the cathodic region on discharge of the cell and passes in the reverse direction on charging of the cell. The bulk of the sodium is housed in a reservoir 16 spaced in the axial direction from the electrolyte tube. In this particular embodiment, the sodium reservoir includes an inverted can 17 containing an inert gas, e.g. nitrogen, under pressure so that the sodium is forced outwardly from the bottom of the can around the outside of the can and thence upwardly into the anodic region 12. Restrictor means (not shown) may be provided in the flow path between the reservoir and the annular region 12 to limit the flow rate.

The region 12 is filled with aluminium flakes 18 which constitute a capillary or wicking system ensuring that the sodium is maintained over the whole surface of the electrolyte tube 10. The flakes substantially fill the volume of the region 12 with small voids between them so as to ensure, as far as possible, that there is a minimum quantity of sodium in the region 12 consistent with keeping the surface of the electrolyte tube wetted with sodium. Because of the good wettability properties of the aluminium flakes, they permit, even with the small pores, adequate flow of sodium for the required electrochemical reaction.

I claim:

1. A sodium sulphur electrochemical cell having a solid electrolyte separating a cathodic reactant from liquid sodium in an anodic region adjacent the surface of the electrolyte wherein said anodic region contains aluminium particles in the form of flakes.

2. A sodium-sulphur cell comprising a tube of solid electrolyte material closed at one end, a cathode current collector, said tube separating a first annular region containing sodium from a second annular region between the tube and said cathode current collector, said second annular region containing sulphur/sodium polysulphides constituting the cathodic reactant, the cell having a sodium reservoir located axially away from the tube beyond the closed end thereof, and wherein said first annular region contains aluminium particles in the form of flakes.

3. A sodium-sulphur cell as claimed in claim 2 wherein said first annular region is between the electrolyte tube and a metal housing and wherein said second annular region is inside the electrolyte tube.

4. A sodium-sulphur cell as claimed in claim 2 wherein flow restricting means are provided between the sodium reservoir and said first annular region to limit the rate of flow of sodium from said reservoir to said first annular region.

* * * * *